United States Patent Office 3,783,135
Patented Jan. 1, 1974

3,783,135
SYNTHESIS OF CODLING MOTH ATTRACTANT
Clive A. Henrick and John B. Siddall, Palo Alto, Calif.,
assignors to Zoecon Corporation, Palo Alto, Calif.
No Drawing. Filed Aug. 20, 1971, Ser. No. 173,662
Int. Cl. C07d 5/04, 7/04, 49/76
U.S. Cl. 260—345.9                                5 Claims

ABSTRACT OF THE DISCLOSURE

Stereospecific synthesis of an attractant for the codling moth by reacting a lithium salt of sorbic acid with 6-lithium hexan-1-ether to yield a trans-8-trans-10-dodecadien-7-one-1-ether which is reduced to yield a trans-8-trans-10-dodecadien-7-ol-1-ether which in turn is reduced via a 7-sulfonic acid ester to yield a trans-8-trans-10-dodecadien-1-ether and hydrolyzed to trans-8-trans-10-dodecadien-1-ol.

BACKGROUND OF THE INVENTION

The present invention relates to the synthesis of trans-8-trans-10-dodecadien-1-ol, an attractant of the codling moth. This moth, *Carpocapsa pomonella*, is a worldwide pest of apples. An identification of this attractant of the codling moth has been reported in Chemical & Engineering News, page 37, Dec. 21, 1970.

It is an object of the present invention to provide a stereospecific synthesis for the preparation of trans-8-trans-10-dodecadien-1-ol and key intermediates therefor which uses readily available starting material and is economical to practice. The compound can be used as an attractant for the monitoring, through selective trapping, of insect populations. Population counts thus obtained are used in determining the frequency and quantity of spray of insecticide or other insect control agent. The compound can also be used for the direct control of insect populations as by mass trapping. Other objects and advantages will become apparent as the invention as hereafter described in detail.

SUMMARY OF THE INVENTION

In the practice of the invention, there is first prepared a trans-8-trans-10-dodecadien-7-one-1-ether (V) which may be outlined as follows:

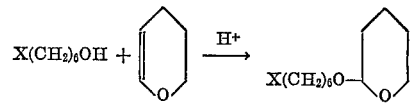

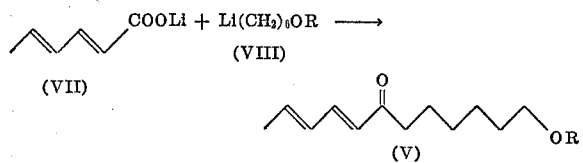

In the above formula, R represents a base stable group such as tetrahydropyran-2-yl, tetrahydrofuran-2-yl, t-butyl, benzyl, trityl and the like protective group which are conventionally employed in organo-metallic reactions such as the Grignard reaction and which are stable under basic reaction conditions.

The ketone (V), a key intermediate, is prepared in accordance with the present invention by reacting the lithium salt of trans sorbic acid, lithium trans-2-trans-4-hexadien-1-ate (VII) with a lithium hexan-1-ether (VIII) to yield a lithium addition product which is hydrolyzed under neutral or basic conditions to give the ketone (V).

As starting materials one may use either 1,6-hexamethylene diol or 6-halohexan-1-ol, both of which are commercially available. If 1,6-hexamethylene diol is used it is selectively halogenated to yield 6-halohexan-1-ol, where the halogen is chloro or bromo. Selective halogenation may be carried out by heating the alcohol with a concentrated aqueous halogen acid or with a phosphorus trihalide. The reaction is catalyzed by the addition of sulfuric acid and the reaction of HCl may be assisted by the addition of zinc chloride. An organic solvent medium inert to the reaction such as an aliphatic or aromatic hydrocarbon and the like, e.g. pentane, heptane, benzene, toluene and the like, is used.

The 6-halohexan-1-ol compound is then reacted with a base stable reagent to form a base stable protective group as illustrated in the following equation:

$$X(CH_2)_6OH + \bigcirc \xrightarrow{H^+} X(CH_2)_6O-\bigcirc$$

The hydroxyl group of the 6-halohexan-1-ol is protected during subsequent reactions by a base stable group. Aliphatic alcohols require protective groups of special types which can later be cleaved under mild conditions. Methyl ether derivatives often used with aromatic alcohols are usually not suitable as protective groups for aliphatic alcohols because the more drastic conditions required for cleavage lead to secondary changes. Several types of base stable groups are suitable, viz ethers such as tetrahydropyran-2-yl, tetrahydrofuran-2-yl, t-butyl, benzyl, trityl, and the like. Tetrahydropyran-2-yl and tetrahydrofuran-2-yl ethers may be prepared by the reaction of the alcohol with dihydropyran and dihydrofuran, respectively, under acid catalysis. This preparation has been reported by Green et al., J. Med. Chem. 10, 533 (1967). The t-butyl ether can be prepared by treating the alcohol with isobutene in the presence of sulfuric acid. These ethers are stable to base, to Grignard reagents, and to oxidation, and the original alcohol can be recovered by gentle hydrolysis.

The lithium salt of the 6-halohexan-1-ether may be prepared by adding 6-halohexan-1-ether dropwise to a stirred suspension of lithium-sodium wire pieces in an anhydrous solution. Suitable solvents include ethers and hydrocarbons including both linear and cyclic ethers such as diethyl ether, di-n-butyl ether, tetrahydrofuran, and the like, and aliphatic hydrocarbons such as heptane, octane, nonane, and the like. The solution should be kept cold and be used within a reasonable time.

The lithium salt of trans sorbic acid (lithium trans-2-trans-4-hexadien-1-ate) may be prepared by the reaction of LiH and sorbic acid such as by the addition of trans sorbic acid to a solution of LiH in anhydrous organic solvent, generally a hydrocarbon or ether solvent, preferably an ether solvent such as 1,2-dimethoxyethane, ether, and the like. The reaction mixture is stirred at room temperature or above until hydrogen evolution ceases and the formation of lithium trans-2-trans-4-hexadiene-1-ate (VII) is complete. The reaction is complete within a few minutes to several hours depending upon the temperature and solvent.

The reaction of lithium trans-2-trans-4-hexadien-1-ate (VII) with a lithium hexan-1-ether (VIII) occurs readily. Lithium trans-2-trans-4-hexadien-1-ate in an anhydrous organic solvent such as an ether or hydrocarbon, preferably an ether as above, is cooled to ice bath temperature or lower, generally about 10° C. to about −40° C., and stirred while a solution containing at least an equivalent amount of 6-lithium hexan-1-ether is added. After the addition is complete, the reaction is allowed to warm to room temperature and stirring continued until the reaction is complete, generally about one to three hours. Cf. Bare et al., Organic Synthesis, 49, 81 (1969). The reaction is believed to proceed by the conversion of the lithium carboxylate to a geminal dilithium alkoxide salt (organolithium complex) which is thought to be stable at room temperature in the absence of proton-donating solvents or reactants.

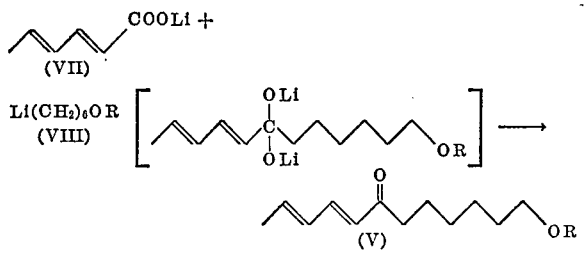

In the above formulas, R represents a base stable group as defined above.

Hydrolysis of the organolithium complex is next accomplished under neutral, basic or slightly acidic conditions such as by treatment with water or an aqueous, dilute or saturated solution of ammonium salts, sodium salts, potassium salts, and the like. For example, ammonium chloride, sodium sulfate, sodium hydroxide, potassium hydroxide, and the like. Hydrolysis under acid conditions should be done with care using very weak acid and/or low temperature in order to avoid prematurely hydrolyzing the base stable protecting group. The ketone (V) product is recovered using conventional techniques of organo-metal chemistry, such as by extraction followed by concentration of the extract and, if desired, purification by distillation or chromatography.

It is also possible to obtain good amounts of the ketone (V) product by an alternative technique whereby two equivalents of the organolithium reagent (VIII) are added with mixing to a solution of trans sorbic acid. The reverse procedure, adding the acid to a solution of organolithium reagent, should be avoided as it appears to always produce substantial amounts of side products. Hydrolysis of the organolithium complex is accomplished as described above.

In the practice of the invention, the reaction product ketone (V), a trans-8-trans-10-dodecadien-7-one-1-ether is reduced to prepare the corresponding alcohol derivative (III) of trans-8-trans-10-dodecadien-7-ol-1-ether which may be outlined as follows:

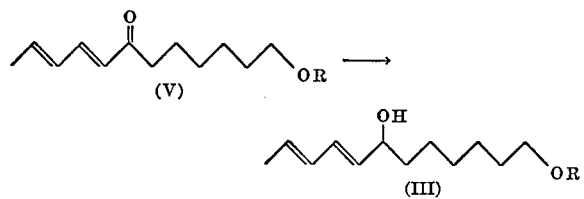

In the above formulas, R represents a base stable group as defined above.

The reduction of alpha,beta-unsaturated ketones to the corresponding unsaturated carbinols with metal hydrides has often been reported to occur with varying amounts of concomitant saturation of the double bond, thereby affording saturated ketone and alcohol product. Since in the practice of this invention it is important to avoid saturation of the trans-8-trans-10-double bonds, it is important to selectively reduce the carbonyl group. It has been found in the practice of this invention that the use of either aluminum hydride or di-isobutylaluminum hydride afford effective routes for the selective reduction of the carbonyl group. The use of aluminum hydride to selectively reduce carbonyl groups has been reported by Brown et al., J. Org. Chem., 34, 2206 (1969). The ketone (V) to be reduced is dissolved in a dry ether such as tetrahydrofuran, tetrahydropyran, and the like, under an inert atmosphere. Aluminum hydride solution in an ether solvent such as tetrahydrofuran is added while the solution is stirred and cooled to ice bath temperature or lower. The aluminum hydride solution in tetrahydrofuran can be prepared by the method of Brown et al., J. Amer. Chem. Soc., 83, 1464 (1966) and Yoom et al., ibid., 90, 2927 (1968).

Alternatively, the selective reduction of the carbonyl group may be accomplished by the use of di-isobutylaluminum hydride. Selective reductions using di-isobutylaluminum hydride have been reported by Wilson et al., Chem. Comm. 1970, 213. The unsaturated ketone (V) is dissolved in a hydrocarbon solvent such as toluene, xylene, hexane, benzene, and the like, under an inert atmosphere. A hydrocarbon solution of di-isobutylaluminum hydride is added, with stirring, while cooling at ice bath temperature or lower. After addition is complete, stirring is continued until the reaction is complete, generally one to four hours. The aluminum salts are then decomposed as by treatment with a large excess of methanol. The precipitated aluminum salts are removed by filtration and washed several times with hot methanol. The combined filtrate and washings are stripped of solvent to yield the alcohol (III) which can be purified by distillation or chromatography. Decomposition of the aluminum salts can be accomplished in numerous ways as is known in metal-organo chemistry. For example, the methods described above for hydrolysis of the organolithium complex can be used.

In the practice of the invention, there is then prepared trans - 8 - trans - 10 - dodecadien - 1 - ether which may be outlined as follows:

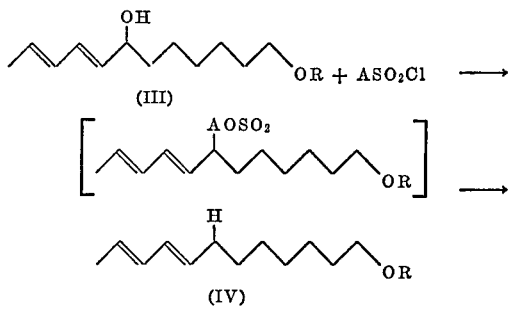

In the formula, R represents a base stable group as defined above and A represents an alkyl or aryl group such as methyl, toluene or a toluene derivative.

The ether (IV), a key intermediate, is prepared in accordance with the present invention by reacting a trans - 8 - trans - 10 - dodecadien - 7 - ol - 1 - ether with an acid chloride of an alkyl or arylsulfonic acid followed by reduction of the resultant sulfonic acid ester. Suitable acid chlorides include methanesulfonyl chloride (usually identified by the abbreviation mesyl chloride), p-toluenesulfonyl chloride (usually identified by the abbreviation tosyl chloride), p-bromotoluenesulfonyl chloride (usually identified by the abbreviation brosyl chloride), and the like. The sulfonic acid esters thus prepared are usually identified by the abbreviations mesylates, tosylates, brosylates, and the like. A facile synthesis of mesylates has been reported by Crossland et al., J. Org. Chem. 35, 3195 (1970). Although these sulfonic acid esters can be prepared by the reaction of the alcohol with a suitable acid chloride in anhydrous pyridine at room temperature, the Crossland et al. synthesis is preferred because it avoids possible side reactions between the sulfonic acid esters produced and the solvent, pyridine. The synthesis reported by Crossland et al. deviates from the usual procedure by the use of triethylamine as a base and methylene chloride as solvent. In the preferred practice of the present invention sulfonic acid esters are prepared using triethylamine as a base and either an ether such as diethyl ether, dipropyl ether, and the like or a hydrocarbon such as pentane, hexane, heptane, and the like, as the solvent.

The sulfonic acid esters formed in the practice of the present invention are very reactive and it is therefore important that the reactants and product be well chilled. The temperature of the ester, in the preferred practice of the invention, should not be above about 5° centigrade. A trans - 8 - trans - 10 - dodecadien - 7 - ol - 1 - ether (III) is dissolved in an anhydrous inert solvent chosen from the solvents discussed above under an inert atmosphere such as helium, argon or the like. The solution is cooled to 0° C. to −78° C. and triethylamine is added with stirring. A sulfonic acid chloride such as mesyl chloride is added dropwise with stirring. Stirring may be continued for several hours.

Instead of isolating the sulfonic acid ester it is preferable to prepare the ether (IV) by reduction of the sulfonic acid ester in solution. Reduction of the sulfonic acid ester completes the reductive elimination of the hydroxyl group of the secondary alcohol (III). Sodium amalgam is the classical reducing agent, however in the practice of the present invention lithium aluminum hydride or sodium bis(2-methoxyethoxy) aluminum hydride are preferred. The sulfonic acid ester is maintained at a temperature below 0° C. and preferably about −20° C. Mesylates are quite useful as synthetic intermediates in this reaction because the mesylate fragment reduces to methyl mercaptan, which is easily removed. An excess of reducing agent is added dropwise with stirring. After the reducing agent is added the reaction mixture may be allowed to warm gradually to room temperature with stirring to insure complete reaction. Following complete reduction the reaction mixture is treated with aqueous ammonium chloride to quench any excess reducing agent remaining in the reaction mixture. The product ether (IV) is isolated from the reaction mixture as a colorless oil.

In the final step of the practice of the present invention the ether (IV) is hydrolyzed to remove the base stable protective group denoted R in compounds (III), (V) and (VIII). As previously discussed the base stable protective groups can be split under mild conditions. Thus

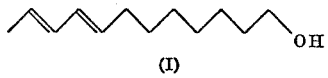

(I)

the attractant of the codling moth (I) can be recovered by gentle hydrolysis of ether (IV) with dilute mineral acids or organic acids such as acetic acid, p-toluenesulfonic acid, and the like, said acids having an approximate pH of two or higher.

The following examples are provided to illustrate the present invention. All temperatures are in degrees centigrade.

EXAMPLE 1

To a stirred suspension of 1.1 gram equivalents of lithium-1% sodium wire pieces in ether at −10° add dropwise one gram equivalent of 2-[(6'-chlorohexyl)oxy] tetrahydropyran in diethyl ether. After addition of the tetrahydropyran is complete stir the reaction mixture several hours until the reaction is complete. The organolithium reaction product should be kept at −10° and used immediately.

EXAMPLE 2

To a solution of one gram equivalent of all-trans sorbic acid in diethyl ether at room temperature add one gram equivalent of lithium hydride in anhydrous 1,2-dimethoxyethane dropwise over a 10-minute period. Stir at room temperature until all lithium hydride is reacted, at which time hydrogen evolution is complete. Cool the reaction mixture to −10° and add one gram equivalent of the organolithium reagent prepared in Example 1 dropwise with stirring, maintaining the temperature at −10° until the addition is complete. The mixture is allowed to rise to room temperature and stand for about two hours to yield an organolithium complex which is then hydrolyzed. The organolithium complex is slowly siphoned into a vigorously stirred cold saturated ammonium chloride solution. Following hydrolysis of the organolithium complex with the saturated ammonium chloride solution, the organic phase is separated and the aqueous phase is extracted with ether several times. The combined organic solutions are dried over magnesium sulfate, filtered and solvent removed to yield 1-(tetrahydropyran-2'-yloxy)-trans-8-trans-10-dodecadien-7-one which is purified by distillation.

EXAMPLE 3

To a solution of one gram equivalent of all-trans sorbic acid in diethyl ether at −10°, add two gram equivalents of the organolithium reagent prepared in Example 1 dropwise with vigorous stirring, maintaining the temperature at −10° until the addition is complete. The reaction mixture is hydrolyzed, concentrated and dried as described in Example 2 above to yield 1-(tetrahydropyran-2'-yloxy)-trans-8-trans-10-dodecadien-7-one.

EXAMPLE 4

Into a round-bottom flask fitted with a magnetic stirrer, are placed, under nitrogen, 2 mmoles of ketone as prepared in Example 2 or 3 and enough dry tetrahydrofuran to bring the total volume of the final solution to 10 ml. The solution is cooled to 0° by means of an ice bath and aluminum hydride solution in tetrahydrofuran (2 mmoles) is added dropwise. The reaction mixture is stirred at 0° for several hours. The mixture is hydrolyzed by the successive addition of water, 15% sodium hydroxide solution, and water. The mixture is filtered, washed once with water and dried over potassium carbonate and evaporated to yield 1 - (tetrahydropyran-2'-yloxy)-trans-8-trans-10-dodecadien-7-ol.

EXAMPLE 5

Into a round-bottom flask fitted with a magnetic stirrer, place, under nitrogen, 1 gram equivalent of ketone as prepared in Example 2 or 3 in benzene. The solution is brought to 0°–5° by means of an ice bath and 1.5 gram equivalents of di-isobutylaluminum hydride in benzene is added slowly with stirring. After two hours of additional stirring, the aluminum salts are decomposed at 5° with a large excess of methanol. The precipitated aluminum salts are removed by filtration and washed several times with hot methanol. The combined filtrate and washings are stripped of solvent and the product distilled to yield 1 - (tetrahydropyran - 2' - yloxy)-trans-8-trans-10-dodecadien-7-ol.

EXAMPLE 6

To a solution of 2-grams of the alcohol of Example 4 or 5 in 15 ml. absolute pentane under an argon atmosphere cooled to −20°, add 1.2 ml. triethylamine with stirring. Stir and add 0.60 ml. mesyl chloride dropwise at −20°. Allow the reaction mixture to stand at −20° for 2 hours to yield the 7-mesylate.

EXAMPLE 7

To the above solution of the 7-mesylate of Example 6, at −20° is added 2 ml. of LiAlH$_4$ in ether (Foote, 3.9 M). Allow the reaction mixture to rise to room temperature and stir overnight. Add 2 ml. H$_2$O dropwise (care should be taken as hydrogen is evolved) and pour the reaction mixture into an aqueous ammonium chloride solution. Extract with diethyl ether and wash with H$_2$O and NaCl. Dry with CaSO$_4$ to yield 1-(tetrahydropyran-2'-yloxy)-trans-8-trans-10-dodecadiene (IV), a colorless oil with an odor of methyl mercaptan.

EXAMPLE 8

One gram of ether (IV) of Example 7 is refluxed with 50 ml. methanol, 10 ml. water and 0.3 gram p-toluene sulfonic acid for one hour. Most of the methanol is removed under reduced pressure. The reaction mixture is extracted with diethyl ether and washed with water and brine and dried with calcium sulfate to yield trans-8-trans-10-dodecadien-1-ol (I), an oil, which can be purified by distillation or chromatography.

EXAMPLE 9

To a solution of 127.19 grams of 1-(tetrahydropyran-2'-yloxy)-trans-8-trans-10-dodecadien-7-ol in 450 ml. absolute diethyl ether under a nitrogen atmosphere cooled to −50° add 72.1 ml. of triethylamine with stirring. Stir and add 37.2 ml. mesyl chloride at −47°. Allow the reaction mixture to warm to −18° to yield the respective 7-mesylate.

EXAMPLE 10

To a solution of the 7-mesylate of Example 6 at −40° is added dropwise 127 ml. of LiAlH$_4$ (3.9 M) in ether. Allow the reaction mixture to rise to room temperature and stir overnight. To the reaction mixture add 70 ml. of aqueous ammonium chloride solution, taking care as hydrogen is initially evolved. Then 500 ml. dry diethyl ether is added and mixture refluxed gently for one-half hour. A granular white precipitate forms which is separated and washed with diethyl ether. The filtrate is dried with calcium sulfate and concentrated under reduced pressure to yield 1-(tetrahydropyran-2′-yloxy)-trans-8-trans-10-dodecadiene.

EXAMPLE 11

117 g. of the ether of Example 10 is refluxed with 500 ml. ethanol, 50 ml. water and 15 grams of p-toluene-sulfonic acid for three hours to yield (I) which is worked up as in Example 8.

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A compound according to claim 5 wherein R is tetrahydropyran-2-yl or tetrahydrofuran-2-yl.
2. A compound according to claim 5 wherein R is benzyl.
3. A compound according to claim 5 wherein R is t-butyl.
4. A compound according to claim 5 wherein R is trityl.
5. The trans,trans isomer of a compound of the following formula:

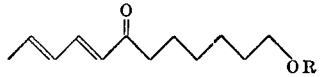

wherein R is tetrahydropyran-2-yl, tetrahydrofuran-2-yl, benzyl, t-butyl, or trityl.

No references cited.

NORMA S. MILESTONE, Primary Examiner

U.S. Cl. X.R.

260—590, 594, 347.8, 632 R